Jan. 25, 1966  R. G. OSWALD ET AL  3,231,462
WAX-COATED PAPER
Filed May 3, 1961
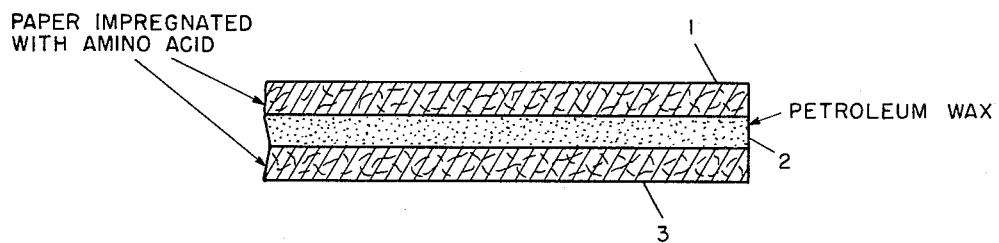
INVENTORS
ROBERT G. OSWALD
WILDON T. HARVEY
BY HERBERT L. JOHNSON
Donald R. Johnson
ATTORNEY

United States Patent Office 3,231,462
Patented Jan. 25, 1966

3,231,462
WAX-COATED PAPER
Robert G. Oswald, Katonah, N.Y., Wildon T. Harvey, Hockessin, Del., and Herbert L. Johnson, Media, Pa., assignors to Sun Oil Company, Philadelphia, Pa., a corporation of New Jersey
Filed May 3, 1961, Ser. No. 107,343
20 Claims. (Cl. 161—235)

This invention relates to the coating of paper with petroleum wax in a manner to form laminated paper or paper articles on which the wax coating is resistant to flaking during use. Paper prepared in the manner of the present invention is particularly useful in the preparation of food containers which are subjected to refrigeration conditions during use, for example, milk containers.

Food products which need to be kept under refrigeration are often packaged in paper containers which have a surface coating of petroleum wax. For example, containers made from paperboard which has been coated with petroleum wax are widely used for dispensing milk. Wax-coated papers also are used widely as wrappers for frozen food products such as vegetables, meats and the like.

While wax-coated paper containers are highly satisfactory in many respects for food packaging, there are certain drawbacks which tend to limit their usefulness. One is that under low temperature conditions resulting from refrigeration, rough handling of the containers or food packages tends to cause the wax to crack and flake off, so that wax flakes may appear in the food product. In the use of wax-coated milk containers the wax is subjected to thermal shock when the cold milk is introduced into a container which is at a higher temperature, and this tends to cause the wax to crack and break off into the milk. Also, with food products, such as meat, which are wrapped in waxed paper and then are frozen for storage, the wax sometimes sticks to the meat when it is unwrapped.

In order to minimize flaking of wax from containers relatively soft waxes generally have been utilized for coating the containers. However, this is disadvantageous in that the softer waxes more readily rub off from the container when it is handled or carried in contact with clothing.

The present invention provides a method of coating paper with petroleum waxes, which method produces a wax coating that has improved resistance to flaking under conditions of general use. The invention also embraces the laminated paper products produced by the present method.

According to the invention, the adherence of petroleum waxes to paper is increased by first impregnating the paper with an amino acid derivable from protein, or with a sodium or potassium salt of such amino acid, and thereafter coating the paper with petroleum wax. This procedure is applicable to both the paraffin waxes and the microcrystalline waxes as well as to mixtures of paraffin and microcrystalline waxes. The presence of a small amount of the amino acid or salt thereof on the paper substantially lowers the tendency of the wax layer to flake and gives a product that is distinctly better for general food packaging use. The mechanism by which this improvement results is not fully understood at present.

In a preferred embodiment of the invention, the wax which is applied to the impregnated paper has incorporated therein a small amount of one or more fatty acids having from 12 to 26 carbon atoms per molecule. Preferably the fatty acid used is one which is derivable from edible fats. The presence of the fatty acid in the wax layer results in a still stronger bond between the paper and wax and further reduces the flaking tendency.

The invention is useful not only for preparing wax-coated paper or paper articles having a single layer of paper, such as wrapping paper or food containers, but also laminated articles having a plurality of paper layers intercalated with wax. Preparation of the intercalated products in the manner of the present invention results in strong adhesion between the paper layers and renders it more difficult form them to be torn apart.

The drawing represents such an intercalated product. Between the layers of papers 1 and 3, which are impregnated with an amino acid derivable from protein or any sodium or potassium salt thereof, is intercalated a layer of petroleum wax 2.

In practicing the invention the material which is used to impregnate the paper prior to application of the wax can be any amino acid which is derivable from protein or any sodium or potassium salt thereof. The material can be a mono- or dicarboxylic acid or corresponding mono- or di-salts thereof and may or may not contain sulfur or hydroxyl groups in the molecule. The preferred materials are glutamic acid and its sodium and potassium salts. Numerous other amino acids derived from proteins are known and any of these are suitable for practicing the invention. A few examples are glycine, analine, leucine, cysteine, methionine, proline, tyrosine, aspartic acid, lysine and hystidine. Numerous other examples can be found in "Organic Chemistry," 3rd edition, Fieser and Fieser, pages 419–422.

The protein-derived amino material is impregnated in the paper in the form of a solution in any suitable solvent, such as water, alcohol, acetone, pantane, heptane, benzene, toluene or the like. The particular solvent used is immaterial so long as it is capable of dissolving at least a small amount (e.g. 0.1–5.0%) of the amino acid or its salt and of being readily evaporated from the paper after the latter has been treated with the solution. After the impregnation treatment, the paper is allowed to dry either at room temperature or at a suitable elevated temperature, and the paper is then coated by dipping it in or spraying it with the wax in molten form.

In the preferred embodiment in which a small amount of a fatty acid is incorporated in the wax to effect a further improvement in the bonding, any fatty acid having 12–26 carbon atoms can be used. The fatty acid can be either saturated or unsaturated. Numerous examples of suitable fatty acids are listed in the aforementioned book of Fieser and Fieser on pages 400–401. When the invention is used to prepare food wrappers or containers, it is distinctly preferable that the fatty acid employed be derived from an edible fat, since it will be harmless in case any of the acid seeps into the food product. The preferred fatty acids for use are lauric, myristic, palmitic and stearic acids.

The fatty acid is incorporated in the wax simply by mixing a small amount of it with the molten wax. Generally the proportion of fatty acid incorporated in the wax will be of the order of 0.2–3.0% by weight, although other amounts are operative. Typically the amount of amino acid or salt applied to the paper in proportion to the amount of fatty acid in the wax film applied thereto will be of the order of 0.05–3.0 moles per mole of the fatty acid.

Certain petroleum waxes or wax blends are known to have better characteristics for coating paper than others and the better waxes generally should be selected for practicing the present invention. Examples of suitable coating waxes have been described in Patent Nos. 2,598,-257, 2,773,812, and 2,783,183. The wax composition can contain small amounts of other additives that are known to enhance the properties for coating applications, for example, low molecular weight polyethylene, atactic polypropylene and ethylene-vinyl acetate copolymers.

The following comparisons illustrate the improvements that can be effected by the present invention:

A microcrystalline petroleum wax having a melting point of about 170° F., SUS @ 210° F. of about 70 and a penetration @ 77° F. of 17 was used as the base stock. In one run (Run A) two strips of #25 sulfite paper of standard size were laminated together using a standard quantity of the wax spread evenly on one side of a strip as the bonding agent. The paper strips had been treated with water and then dried in an oven at about 215° F. before application of the wax. In a second run (Run B) the strips were first treated with a 1% aqueous solution of mono-sodium glutamate, then dried in the same way and laminated by means of the wax in the same manner. A third run (Run C) was made in the same manner as the second run, except that in this case 1% by weight of stearic acid had been blended into the wax. The three sets of strips were subjected to a standardized adhesion test in which the force required to cause the strips to begin tearing apart was measured. The force was expressed in terms of grams per two inch strip width. Each run was repeated a second time and the average for each pair of runs was determined. Results were as follows:

|  | Adhesion, g./2" |
|---|---|
| Run A | 25 |
| Run B | 37 |
| Run C | 44 |

Comparison of Run B with Run A shows that impregnation of the paper with mono-sodium glutamate, without any addition to the wax, caused a substantial increase in the adhesive strength. Run C shows that the addition of stearic acid to the wax caused a further substantial increase in the adhesive value.

Substantially similar improvements are effected by substituting other amino acids or salts, as herein specified, for sodium glutamate and by substituting other fatty acids, as herein specified, for stearic acid.

It is postulated that the further improvement effected by the addition of the fatty acid to the wax may be due at least in part to a chemical bonding between the carboxyl group of the fatty acid and the amino group of the protein derived compound impregnated on the paper. As previously indicated, no explanation is apparent at present for the improvement effected by the amino acid or salt alone.

Since in practicing the present invention one type of bonding agent used is derivable from protein and the other type can be derived from edible fats, it will be apparent that the wax-coated paper or food containers prepared are entirely safe for use in contact with food products even though in some cases small amounts of the bonding agents may seep into the food.

We claim:

1. Method of coating paper with wax which comprises impregnating the paper with a small amount of a material selected from the group consisting of amino acids derivable from protein and the sodium and potassium salts thereof, and thereafter coating the paper with a petroleum wax.

2. Method according to claim 1 wherein said material is sodium glutamate.

3. Method according to claim 1 wherein said wax contains a small amount of a fatty acid having 12–26 carbon atoms.

4. Method according to claim 3 wherein said fatty acid is derivable from an edible fat.

5. Method according to claim 4 wherein said fatty acid is stearic acid.

6. Method according to claim 4 wherein the fatty acid is present in the wax in amount of 0.2–3.0% by weight.

7. Method according to claim 4 wherein the amount of said material impregnated on the paper is 0.05–3.0 moles per mole of fatty acid in the wax.

8. As an article of manufacture, wax-coated paper comprising a layer of paper which has been impregnated with a small amount of a material selected from the group consisting of amino acids derivable from protein and the sodium and potassium salts thereof and a layer of petroleum wax coated on the paper.

9. An article according to claim 8 wherein said material is sodium glutamate.

10. An article according to claim 8 wherein said wax contains a small amount of a fatty acid having 12–26 carbon atoms.

11. An article according to claim 10 wherein said fatty acid is derivable from an edible fat.

12. An article according to claim 11 wherein said fatty acid is stearic acid.

13. An article according to claim 11 wherein the fatty acid is present in the wax in amount of 0.2–3.0% by weight.

14. An article according to claim 11 wherein the amount of said material impregnated on the paper is 0.05–3.0 moles per mole of fatty acid in the wax.

15. A container for food packaging in which the container wall comprises paper impregnated with a small amount of a material selected from the group consisting of amino acids derivable from protein and the sodium and potassium salts thereof and a surface coating of petroleum wax containing a small amount of a fatty acid having 12–26 carbon atoms and derivable from an edible fat.

16. A container according to claim 15 wherein the fatty acid is present in the wax in amount of 0.2–3.0% by weight and the amount of said material impregnated on the paper is 0.05–3.0 moles per mole of fatty acid in the wax.

17. A container according to claim 16 wherein said material is sodium glutamate and the fatty acid is stearic acid.

18. As an article of manufacture, laminated paper comprising a plurality of paper layers which have been impregnated with a small amount of a material selected from the group consisting of amino acids derivable from protein and the sodium and potassium salts thereof and having a layer of petroleum wax intercalated therebetween.

19. An article according to claim 18 wherein said wax contains a small amount of a fatty acid having 12 to 26 carbon atoms.

20. An article according to claim 19 wherein said fatty acid is stearic acid.

References Cited by the Examiner

UNITED STATES PATENTS

| 892,074 | 6/1908 | Obici. | |
|---|---|---|---|
| 2,233,141 | 2/1941 | Musher. | |
| 2,639,242 | 5/1953 | Suen | 117—155 |
| 2,891,882 | 6/1959 | Macha | 117—164 X |

WILLIAM D. MARTIN, *Primary Examiner.*

RICHARD D. NEVIUS, *Examiner.*